United States Patent [19]

Gamblin et al.

[11] Patent Number: 4,644,369

[45] Date of Patent: Feb. 17, 1987

[54] RANDOM ARTIFICIALLY PERTURBED LIQUID JET APPLICATOR APPARATUS AND METHOD

[75] Inventors: Rodger L. Gamblin, Dayton; Rodger C. Burchett, Miamisburg, both of Ohio

[73] Assignee: Burlington Industries, Inc., Greensboro, N.C.

[21] Appl. No.: 732,278

[22] Filed: May 9, 1985

Related U.S. Application Data

[63] Continuation-in-part of Ser. No. 428,490, Sep. 28, 1982, Pat. No. 4,523,202, which is a continuation-in-part of Ser. No. 231,326, Feb. 4, 1981, abandoned.

[51] Int. Cl.$^4$ ............................................ G01D 15/18
[52] U.S. Cl. ........................................ 346/75; 331/78; 346/1.1
[58] Field of Search ..................... 346/75, 1.1, 140; 331/78; 364/717; 239/4, 102

[56] References Cited

U.S. PATENT DOCUMENTS

| | | | |
|---|---|---|---|
| 2,753,453 | 7/1956 | Michels | 331/78 X |
| 2,773,185 | 12/1956 | Fulton | 331/78 |
| 2,997,662 | 8/1961 | Garner | 331/78 |
| 3,298,030 | 1/1967 | Lewis | 346/75 |
| 3,373,437 | 3/1968 | Sweet et al. | 346/75 |
| 3,416,153 | 12/1968 | Hertz et al. | 346/75 |
| 3,427,478 | 2/1969 | Etter | 331/78 X |
| 3,484,793 | 12/1969 | Weigl | 346/75 |
| 3,560,988 | 2/1971 | Kirck | 346/75 X |
| 3,575,606 | 4/1971 | Bledsoe | 331/78 X |
| 3,579,721 | 5/1971 | Kaltenbach | 425/3 |
| 3,586,907 | 6/1971 | Beam | 346/75 X |
| 3,596,275 | 7/1971 | Sweet | 346/75 X |
| 3,622,905 | 11/1971 | Brown | 331/78 |
| 3,652,953 | 3/1972 | Victoreen | 331/78 |
| 3,656,171 | 4/1972 | Robertson | 346/75 X |
| 3,673,601 | 4/1972 | Hertz | 346/75 |
| 3,675,148 | 7/1972 | Edwards | 331/78 |
| 3,798,656 | 3/1974 | Lowy et al. | 346/75 X |
| 3,868,698 | 2/1975 | Dressler | 346/75 |
| 3,882,508 | 5/1975 | Stoneburner | 346/75 X |
| 3,891,121 | 6/1975 | Stoneburner | 346/75 X |
| 3,898,671 | 8/1975 | Berry et al. | 346/75 |
| 3,916,421 | 10/1975 | Hertz | 346/75 |
| 3,944,945 | 3/1976 | Corte | 331/78 |
| 3,956,756 | 5/1976 | Paton | 346/75 |
| 4,005,435 | 1/1977 | Lindquist et al. | 346/75 X |
| 4,018,383 | 4/1977 | Paton | 346/75 X |
| 4,074,277 | 2/1978 | Lane | 346/75 |
| 4,095,232 | 6/1978 | Cha | 346/75 |
| 4,169,249 | 9/1979 | Hoffmann | 331/78 |
| 4,223,320 | 9/1980 | Paranupe | 346/75 |
| 4,523,202 | 6/1985 | Gamblin | 346/75 |

FOREIGN PATENT DOCUMENTS

| | | |
|---|---|---|
| 2154472 | 11/1971 | Fed. Rep. of Germany . |
| 1095689 | 12/1967 | United Kingdom . |
| 1417597 | 12/1975 | United Kingdom . |

OTHER PUBLICATIONS

"Spray Printing for Fabrics", by Dr. J. Eibl Leverkusen, Chemiefasern/Textil-Industrie, Jul. 1977, pp. 636–645, English Translation, pp. E113–E115.

List Continued on next page.

*Primary Examiner*—Joseph W. Hartary
*Attorney, Agent, or Firm*—Nixon & Vanderhye

[57] ABSTRACT

Randomly generated artificial perturbation signals are acoustically coupled to fluid jets to artificially stimulate droplet formation at a rate which varies. Such changes minimize the discernible effects of anomalies in droplet formation (e.g. along the cross-machine dimension of an extended orifice array) caused by standing acoustic waves or other phenomena. A relatively low frequency bandwidth-limited square wave with randomly occurring transitions has a controlled amplitude related to a desired magnitude of deviation in the rate of droplet stimulation. This first random signal is used, in the exemplary embodiment, to control the frequency of a frequency modulated oscillator having a relatively higher mean frequency related to the naturally expected rate of droplet formation. As a result, piezoelectric crystal drive furnished by the oscillator randomly varies between upper and lower frequency limits. Provision is also made to ensure that such transition between upper and lower frequency limits is accomplished in a controlled and relatively gradual manner.

26 Claims, 9 Drawing Figures

OTHER PUBLICATIONS

"Ink-Jet Printing", by Larry Kuhn et al., Scientific American, Apr. 1979, pp. 162–178.

"Ink-Jet Printing—A New Possibility in Textile Printing", by Rudolf Meyer et al, Melliand Texiberichte [English Edition], Feb.–Mar. 1977, pp. 162–165, 225–261.

"Ink Jet Printing", by Fred J. Kamphoefner, IEEE Transactions on Electron Devices, vol. ED-19, No. 4, Apr. 1972, pp. 584–593.

"DIJIT Ink Jet Printing", by Peter L. Duffield, TAGA Proceedings for 1974, pp. 116–132.

"Jet Set": by Mike Keeling appearing in British Journal identifies as Erit PRTR, vol. 93, No. 6 for Jun. 1980, apparently at pp. 21 et seq.

Fig. 5
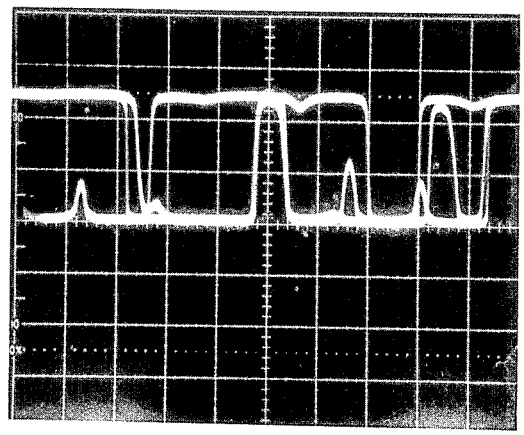
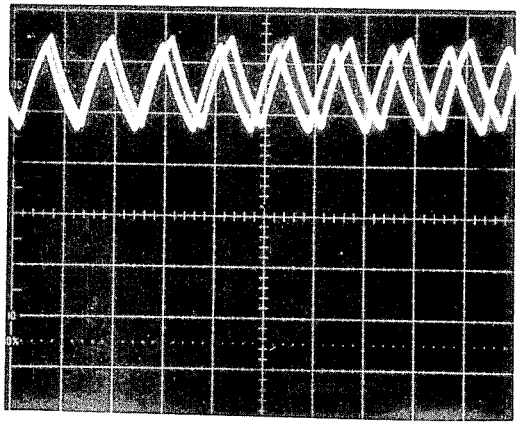
Fig. 6
Fig. 7
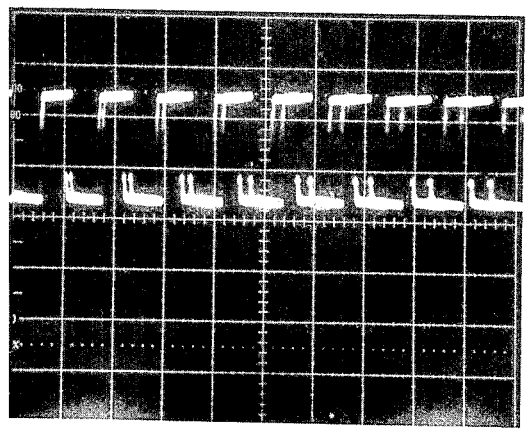
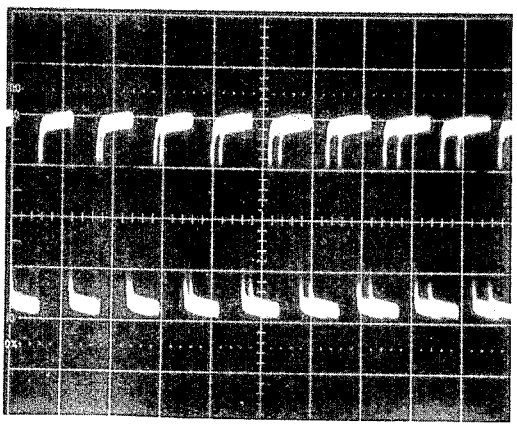
Fig. 8

RANDOM ARTIFICIALLY PERTURBED LIQUID JET APPLICATOR APPARATUS AND METHOD

This application is a continuation-in-part of earlier applications of Rodger L. Gamblin: Ser. No. 428,490 filed Sept. 28, 1982 (now U.S. Pat. No. 4,523,202 which is, in turn, a continuation in part of earlier copending application Ser. No. 231,326 filed Feb. 4, 1981 (now abandoned in favor of application Ser. No. 428,490). The contents of these earlier related applications are hereby expressly incorporated by reference into the present application.

This invention is generally related to electrostatic fluid jet applicators for selectively applying fluid droplets to the surface of a relatively moving substrate. In particular, it is directed to an improved apparatus and method for stimulating the fluid droplet formation process in such an applicator.

Electrostatic fluid jet applicators of many different designs are now well known in the art. For example, the exemplary embodiment of this invention uses a fluid jet applicator which permits uncharged droplets to fall downwardly onto a relatively moving substrate while selectively charged droplets are deflected away and into a droplet catcher structure. In this manner, desired patterns of fluid droplets can be deposited onto a substrate surface (e.g. various inks, dyes, or other treatment liquids can be deposited onto paper, textile or other substrate surfaces). In general, a fluid reservoir is in fluid communication with an array of orifices distributed along a cross-machine direction generally transverse to the direction of substrate movement. The fluid reservoir is typically pressurized so as to force fluid filaments through the array of orifices. Such filaments are naturally or artificially stimulated to break into droplets along a "droplet formation" zone. An array of electrostatic charging electrodes is typically mounted so as to selectively induce electrical charges on the liquid filament in this droplet formation zone. In this manner, if a given charging electrode is appropriately energized at the time a droplet forms, such an induced charge is trapped onto the droplet and it becomes electrically charged. All of the droplets subsequently pass through a fixed electrostatic deflection zone. Those droplets which have not become charged simply pass through the zone and onto the relatively moving substrate therebeneath. However, those selected droplets which have been charged are deflected away from the normal trajectory and into a droplet catching structure which typically employs a suction source to aid in capturing the droplets and transferring them for reuse back into the fluid supply system.

It has long been known that pressurized fluid filaments will naturally break into droplets at a frequency or rate which is related to many variables including fluid viscosity, pressure and orifice size. However, until the Gamblin invention described in the above-referenced related application Ser. No. 231,326, it was generally accepted that precisely regular (i.e. coherent) periodic artificial perturbation was required to regularize and control the droplet formation process.

While such regularized droplet formation processes are advantageous if they can be uniformly realized across the entire orifice array, practical experience has shown that such a desired result can only be obtained for relatively short cross-machine dimensions (e.g. on the order of 10-12 inches or so). Even here, it is often necessary to take extreme care in the design and/or manufacture of such systems so as to avoid the appearance of acoustic standing waves within the system which produce nodes and antinodes and corresponding cusps and/or nulls at spaced points along the orifice array thus producing undesirable nonuniformities in the printing process as a function of distance along the cross-machine dimension of the orifice array.

When electrostatic fluid jet applicators of this general type are to be used for relatively elongated cross-machine dimensions (e.g. up to 1.8 meters or so in many textile applications), the difficulty of avoiding such nonuniform droplet formation processes due to standing acoustic waves or other phenomena using prior art techniques become virtually insurmountable. While it might be at least conceptually possible to array a succession of shorter length mechanisms end-to-end so as to collectively span such an elongated cross-machine dimension, such an approach would in itself cause enormous manufacturing/operational problems in achieving a non-discernible juncture between the adjacent end points of such an end-to-end array of shorter fluid jet applicator devices.

It was already recognized by Gamblin in the above-referenced earlier related applications that elongated cross-machine dimensions of a single electrostatic jet applicator could nevertheless be realized if one turned away from the conventional wisdom so as to actively seek a certain degree of randomness in the droplet formation process—and thus to avoid acoustic standing waves or other such phenomena which give rise to nonuniformity (e.g. cusps and/or nulls) in the droplet formation process when regular periodic artificial perturbations are employed. We have now discovered additional embodiments of such random artificially perturbed electrostatic fluid jet applicator apparatus and method which are believed to be particularly suited to elongated orifice arrays (e.g. substantially longer than 10–12 inches or so and possibly as long as 1.8 meters or more). Here, even if acoustic standing waves are not altogether avoided, the discernible effects of such phenomena are masked by random movements of any non-uniformities along the array.

We have discovered that merely changing or varying the stimulation frequency at a sufficiently rapid rate may avoid any discernible fixed pattern of nonuniform printing in the finished substrate product. Preferably, such changes in the stimulation frequency occur at random times; however, this may not be essential in all cases. In effect, by purposefully changing the stimulation frequency, any cusps and/or nulls which may occur in the droplet formation process are "dithered" or otherwise moved about sufficiently in position along the orifice array at a sufficiently rapid/random rate so as to avoid visual discernment in the finished substrate product. Deviation in the stimulation frequency of as little as ±2.5% may be sufficient although even more deviation (e.g. ±10%) may be appropriate under other conditions.

The above-referenced earlier related applications also proposed a totally unstimulated system where totally random naturally occurring droplet formation processes are employed. Ambient random acoustic sources in the operating environment may also contribute to droplet stimulation in such non-artificially stimulated systems. However, in general, such random droplet formations may at times lead to rather long and variable droplet breakoff filament lengths so that some difficulty may be experienced with maintaining the droplet break-off point within the effective region of the electrostatic charging plates. Accordingly, as taught in the earlier related applications, such charge plates are preferably somewhat wider so as to more surely encompass a somewhat more extensive droplet formation zone. Nevertheless, some droplets still may not be fully charged thus leading to some difficulty in subsequent catching operations and/or with splatter onto the substrate when the applicator shifts from a full droplet catching condition to a full droplet printing condition.

For a relatively short orifice array, such problems tend to be alleviated by merely stimulating the liquid and thus the droplet formation process with a single pure frequency signal. However, unless precautions are taken (even with relatively short arrays and/or when relatively elongated orifice arrays are utilized), standing acoustic waves or other similar phenomena tend to cause the formation of nodes and/or cusps in the droplet formation process along the array—even though the droplet formation zone is much better defined and more easily maintained in the vicinity of the charging electrode.

As one begins to apply random artificial perturbations to such a system, it has been discovered that the droplet catching process improves because the standing acoustic waves generating cusps and/or nulls are no longer in stationary positions along the orifice array. At the same time, there may sometimes be some degradation of print line uniformity as changes in the acoustic standing waves occur (i.e. as they are shifted about from one location to another) due to the random artificial perturbations. Our experience indicates that such degradation in print line uniformity is generally negligible provided that the random artificial perturbations only vary within about 5 percent of the center or mean stimulation frequency. Thus, if a center frequency of 50 KHz is employed, then a ±5% deviation would involve a shift of up to a maximum of about 2.5 KHz to either side of that center frequency. At such relatively low levels of random artificial perturbation, the catching process is improved and most nodal print line nonuniformities are no longer discernible in the resulting substrate.

As the degree of random artificial perturbation (i.e. deviation from a center frequency) is increased, we note that the print line quality tends to eventually degrade to approximately the same as in the completely non-stimulated mode of operation. Although it is difficult to define precise operable ranges of random artificial perturbation, it presently appears that optimum perturbation occurs when there is approximately ±5% to ±10% deviation from a mean stimulation frequency. Extremely low deviation (e.g. ±1%) tends to produce noticeable print line degradation expected with pure single frequency stimulation due to the formulation of essentially stationary cusps/nulls. On the other hand, relatively large levels of random artificial perturbation (e.g. ±25%) tend to leave the usual droplet catching problems.

As previously mentioned, the desired changes in droplet stimulation frequency preferably occur in a random manner so as to further camouflage any discernible nonuniform print patterns in the printed substrate. In general, it has been discovered that quite good results are obtained when the stimulation frequency is varied at random time intervals (but within a limited bandwidth) over a predetermined relatively small range. Thus, if a center or mean frequency ($f_1$) is desired, then this frequency is varied at random times between a lower limit of $f_1 - \Delta f$ and an upper limit of $f_1 + \Delta f$, where $\Delta f$ is the magnitude of frequency deviation.

Since the stimulation frequency is effectively frequency modulated in this exemplary embodiment, the energy spectrum in the frequency domain is expected to include a series of decreasing amplitude spectral bands at spacings which correspond to multiples of the center frequency with relative amplitude of the bands being determined by a Bessel function which, in turn, has as its independent variables the percent RAP and rate of change of frequency modulation. Percent RAP (random artificial perturbation) is defined by the ratio ($\Delta F/f_1$) multiplied by 100. Because the frequency modulation is preferably obtained in a random manner, the frequency spectrum shape may be expected to be somewhat diffuse but to have, for practical purposes, a bandwidth given roughly by $2\Delta f$.

In a first exemplary embodiment, a cascaded chain of CMOS amplifiers is used to amplify the inherent noise of the input stage and to produce a clamped amplitude random frequency squarewave which is bandlimited within approximately 8-17 Hz. A controllable voltage divider then taps off a desired magnitude of this random frequency square wave as the modulator input to a frequency modulated oscillator (e.g. a relaxation or hysteresis type oscillator as is commonly realized using a 555 type integrated circuit). An RC filter is preferably employed so as to insure a relatively gradual transition from one frequency extreme to the other (e.g. having an RC time constant of about 500 microseconds). The FM oscillator preferably also includes a center or mean frequency adjustment so as to cause the mean frequency of operation to occur at a relatively high rate (e.g. in excess of 25 KHz and typically on the order of 38-60 KHz in the exemplary embodiment). As orifice size gets larger (e.g. as for carpets where more fluid per unit area is desired) the mean stimulation frequency will be lower (e.g. 14-18 KHz) but it will still be relatively high with respect to the rate of derivation. A further output amplitude voltage divider is then used to tap off an appropriate level of the FM oscillator output which, through a conventional buffer amplifier, is used to drive a piezoelectric crystal that is acoustically coupled to the fluid reservoir feeding an orifice array.

Another exemplary embodiment uses a broad band noise generator to feed a gain controlled amplifier in a feedback loop which permits adjustment of the maximum peak-to-peak amplifier noise output. This gain controlled output is then used as the frequency modulator control input to a frequency modulated waveform generator which produces a predetermined waveform (e.g. sinusoid) having an adjustable mean frequency and output amplitude and which is frequency modulated in accordance with the magnitude of the control input signal. The output from the waveform generator is then conventionally buffered before being used to drive a piezoelectric electromechanical transducer which is acoustically coupled to the liquid in the fluid jet applicator.

These as well as other objects and advantages of this invention will be better understood and appreciated by carefully reading the following detailed description of the presently preferred exemplary embodiments of this invention in conjunction with the accompanying drawings, of which:

FIGS. 5–8 are photocopies of oscillograph tracings of wave forms monitored at various points in the circuit of FIG. 3.

Figure 1:
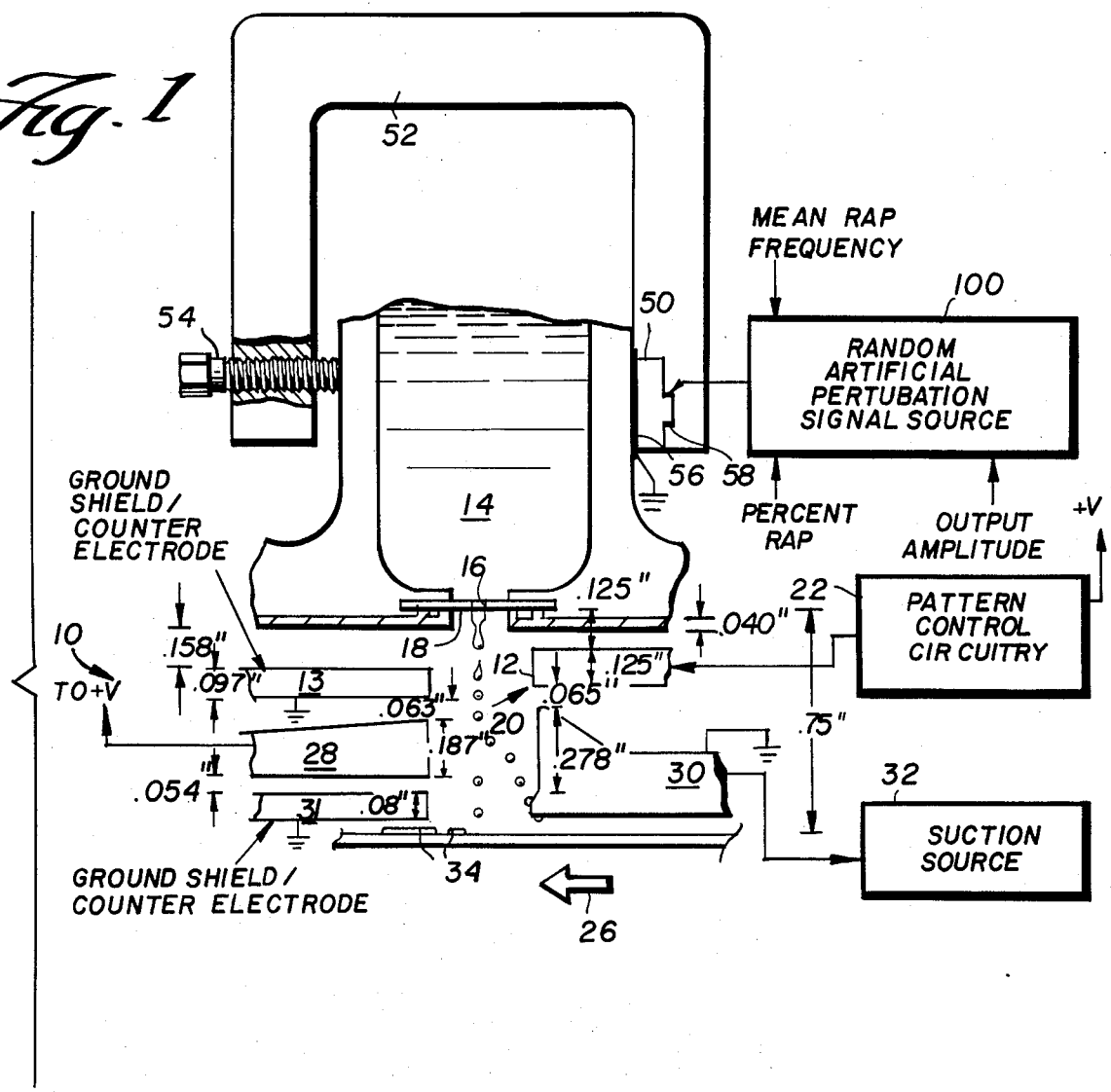
FIG. 1 is a generalized schematic view of an artificially perturbed electrostatic fluid jet applicator apparatus and method using random artificial perturbation in accordance with this invention.

A random artificially perturbed electrostatic fluid jet applicator 10 is generally depicted in cross section and schematic form at FIG. 1. It includes a pressurized reservoir of fluid 14 feeding a linear array (oriented with its longitudinal axis perpendicular to the plane of FIG. 1) of orifices 16 in an orifice plate 18 so as to produce liquid filaments from each orifice which break into droplets along a droplet formation zone 20. If a proximately positioned electrode 12 has been energized (e.g. by conventional pattern control circuitry 22) at the time a droplet is formed, then such droplet will become electrostatically charged (e.g. by trapping thereon an induced electric charge). A combination shielding-/counter electrode 13 is typically faced on the opposite side of the jet array to assist in the charging process as will be appreciated. After the droplets are formed at zone 20, they continue to fall downwardly toward a substrate 24 (moving in a "machine" direction 26 transverse to the "cross-machine" direction of arrayed orifices 16 (the "cross-machine" direction is perpendicular to the plane of FIG. 1). During such passage, the droplets fall into a constant transverse electrostatic deflection field defined by electrodes 28, 30. Another grounded shield/counter electrode 31 may typically be employed at the lower portion of catcher 30 as will also be appreciated. Electrode 30 is actually constructed as a droplet "catcher" structure. Typically, a suction source 32 is utilized to removed the droplets from the catcher 30 and to return them to a fluid supply for fluid reservoir 14. In this manner, desired patterns of print 34 may be achieved on the passing substrate by selective deposition of droplets.

The dimensions depicted in FIG. 1 are those for a non-limiting exemplary embodiment and will vary from one specific application/embodiment to another as will be appreciated by those in the art.

An electro-acoustic transducer such as piezoelectric crystal 50 is typically acoustically coupled to the fluid filaments in such a manner as to influence the droplet formation process. In the exemplary embodiment, such coupling is achieved by mechanically clamping the piezoelectric crystal 50 to a sidewall of the fluid reservoir 14. As depicted in FIG. 1, a relatively massive clamp 52 (including adjustment screw 54) is utilized to maintain the piezoelectric crystal apparatus in intimate contact with a sidewall of a fluid reservoir. Typically, a thin flexible conductive sheet electrode 56 (e.g. beryllium-copper) may form one electrode on the piezoelectric crystal while another electrode 58 is driven by a random artificial perturbation signal source 100. As indicated in FIG. 1, the exemplary signal source 100 includes control inputs (e.g. manual adjustment of potentiometers or the like) for determining the mean random artificial perturbation (RAP) frequency as well as the percent RAP and the amplitude of output signals actually delivered to drive the piezoelectric crystal 50.

Figure 2:
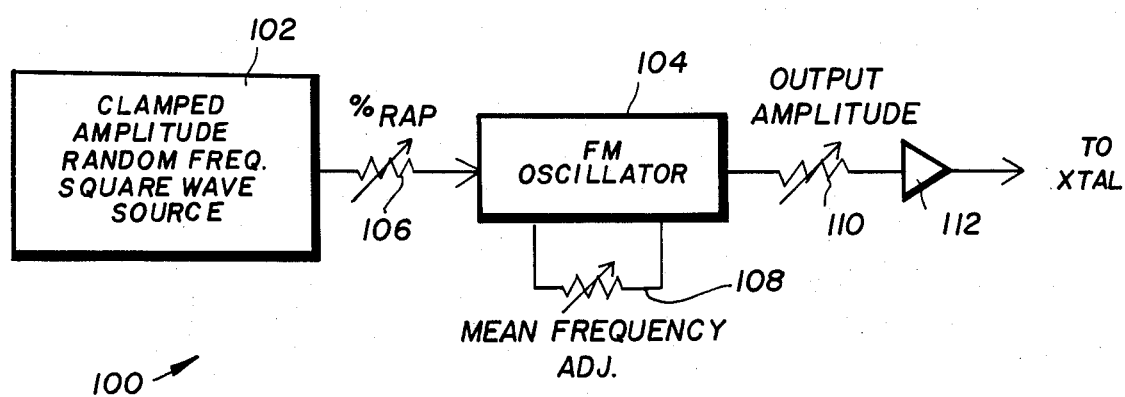
FIG. 2 is a general block diagram of one exemplary embodiment of the random artificial perturbation apparatus shown in FIG. 1.
Figure 3:
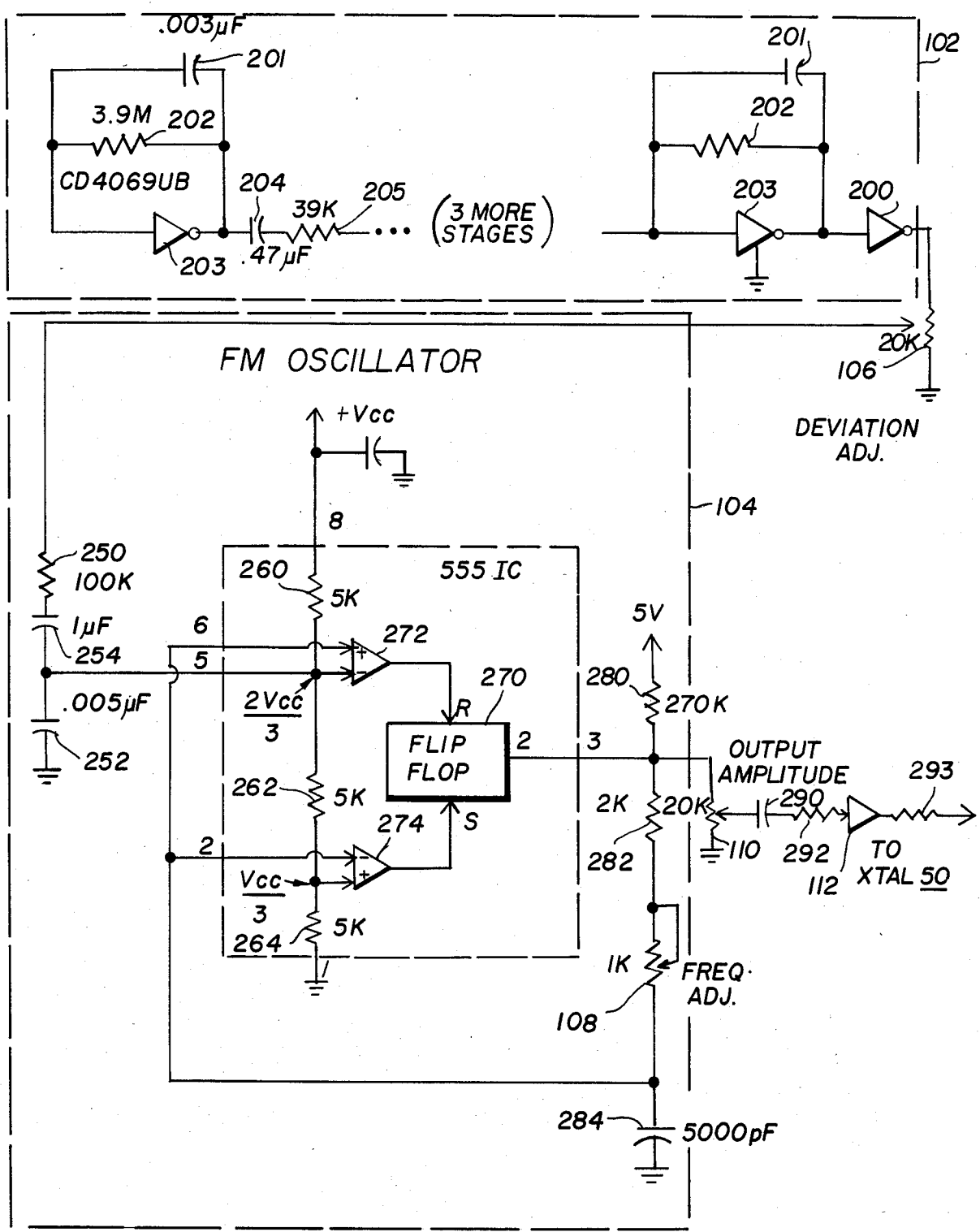
FIG. 3 is a more detailed electrical schematic circuit diagram of the exemplary embodiment shown in FIG. 2.

A presently preferred exemplary embodiment of the random artificial perturbation signal source 100 is shown in more detail at FIGS. 2 and 3. Here, a clamped amplitude, but random frequency, square wave source 102 provides the control input to a frequency modulated oscillator 104. Other forms of "noise" or random signal sources might also be used. Typically, a frequency deviation control or percent RAP control 106 is included so as to control the maximum frequency deviation of the FM oscillator 104. The oscillator 104 typically also includes a mean frequency adjustment mechanism 108. The amplitude of the electrical drive signals delivered to the crystal may be adjusted as at 110 either prior to or after a conventional buffer amplifying stage 112 (or perhaps as part of the buffer amplifier itself).

As depicted in more detail at FIG. 3, the noise source 102 utilizes a five-stage cascaded CMOS tuned linear amplifier having an approximately 8–17 Hertz bandpass and a gain of approximately $10^{19}$. The high gain of such an amplifier chain selectively amplifies the inherent noise of the first stage (which happens to fall within the amplifier bandpass) sufficiently to saturate a final CMOS logic inverter output stage 200. It will be appreciated that the capacitor 201 and resistor 202 constitute conventional feedback elements for the CMOS amplifier 203 (which may be realized as one stage of a CD 4069UB integrated circuit) while capacitor 204 and resistor 205 provide conventional interstage coupling for the cascaded chain of amplifiers. As indicated in FIG. 3, the first amplifier 203 has no signal input and thus the entire chain serves merely to amplify the inherent noise of this first stage.

Figure 4:
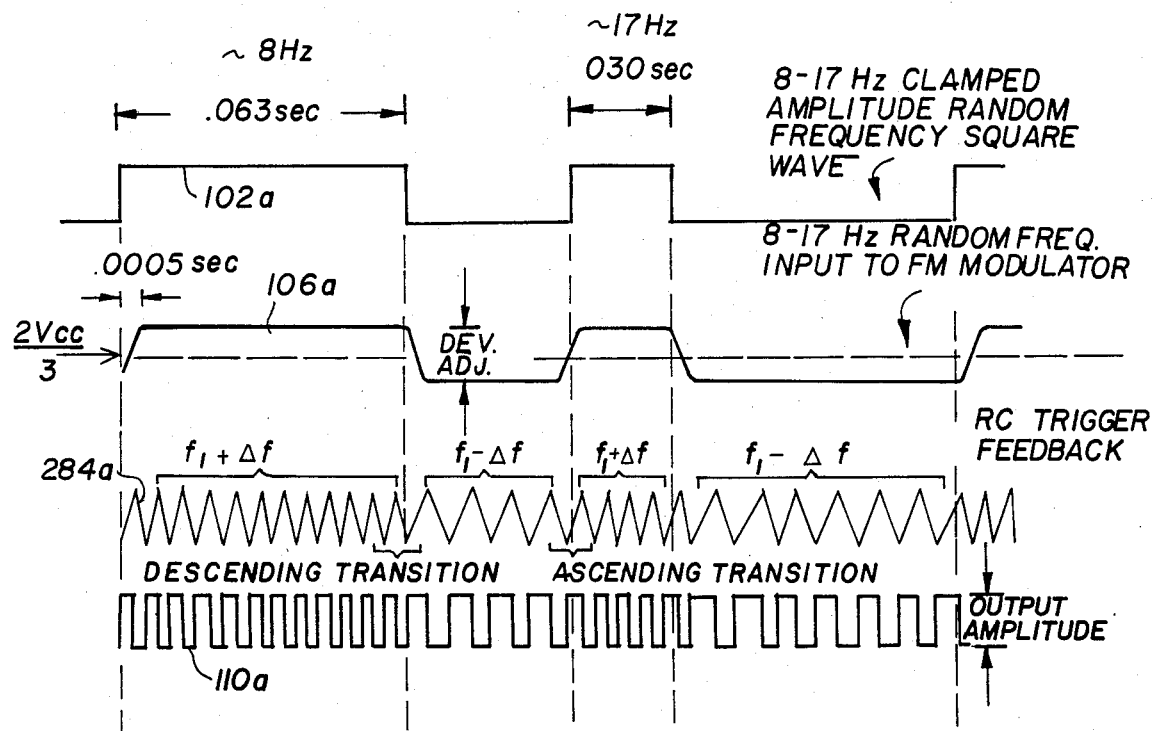
FIG. 4 is a wave form diagram useful in explaining the operation of the circuit shown in FIG. 3.

The resulting output of the noise source 102 is depicted as wave form 102a in FIG. 4. As will be observed, it constitutes a clamped (i.e. fixed) amplitude square wave having transitions which occur at a random frequency within the 8–17 Hertz amplifier bandwidth. An actual photograph of multiple overlaid oscilloscope traces of such a waveform is depicted in FIG. 5. It will be observed that there are a few lesser amplitude pulses observable in some of the multiple traces included in that photograph. These represent relatively higher frequency noise transitions which are substantially attenuated because they fall outside the natural bandpass of the cascaded amplifier chain.

If, for purposes of illustration, it is assumed that the output of the noise source is narrowly limited to the 8–17 Hertz bandwidth, then transitions will occur at randomly occurring time intervals with spacings between about 30 milliseconds (e.g. ½ cycle at 17 Hertz) up to as much as about 63 milliseconds (e.g. ½ cycle at 8 Hertz). In reality, of course, the bandwidth will not be quite so sharply delineated and there may be somewhat greater variations between random transition times in the output waveform of the noise source 102.

The FM oscillator 104 in this exemplary embodiment includes a conventional type 555 integrated circuit connected to form an astable multivibrator having a variable period (and therefore variable output frequency) within a range suitable for fluid jet droplet stimulation (e.g. 15–20 microseconds for appropriately sized orifices, fluid pressure, etc.). The mean frequency may be adjusted by potentiometer 108 and then deviated therefrom in accordance with a modulation control input to pin 5 of the type 555 IC. The modulation input is adjusted to an appropriate magnitude for the desired frequency deviation by potentiometer divider 106 and coupled to pin 5 of the 555 IC via an RC circuit comprising a relatively large resistor 250 (so as to create an effective high output impedance current source) and capacitor 252 (capacitor 254 is typically so large as compared to capacitor 252 that it operates strictly as an AC coupling capacitor).

In the exemplary embodiment, the RC time constant of this modulation input circuit is approximately 0.5 milliseconds so as to insure a relatively gradual transition between high and low level modulation control inputs. The approximate shape of the modulation input to pin 5 of the 555 IC is depicted at wave form 106a in FIG. 4 (with exaggerated transition times so as to illustrate the gradual transition caused by resistor 250 and capacitor 252). As shown in FIG. 3, the $V_{cc}$ supply voltage is divided into thirds by resistors 260, 262, and 264 such that the nominal voltage at the modulation control input is held at two-thirds $V_{cc}$. Accordingly, FIG. 4 depicts the average value of wave form 106a as two-thirds $V_{cc}$ with a magnitude chosen by the deviation adjustment potentiometer 106.

The 555 IC device is a monolithic RC timing circuit which includes an RS flipflop 270, two voltage comparators 272 and 274 and a voltage divider providing two reference voltages $\frac{1}{3} V_{cc}$ and $\frac{2}{3} V_{cc}$ with resistors 260, 262 and 264 all connected as shown in FIG. 3.

The reference voltages provided by the divider are input to respective ones of the comparators 272 and 274 while the other inputs to the comparators are brought out at pins 2 and 6 to an RC timing circuit comprising resistors 280, 282 and 108 and capacitor 284. Flipflop 270 is reset by comparator 272 and set by comparator 274 while the Q output of flipflop 270 (or alternatively, the $\bar{Q}$ output) is utilized to drive the RC timing circuit and to provide the FM oscillator output. Whenever the voltage at pin 2 (the trigger threshold) falls below $\frac{1}{3} V_{cc}$, comparator 274 will set flipflop 270 thus causing a "high" output at pin 3 (e.g. approximately $V_{cc}$) In response, the timing capacitor 284 will begin to charge toward this higher voltage. As it rises above $\frac{2}{3} V_{cc}$, the upper comparator 272 will transition so as to reset flipflop 270 thus causing the output voltage at pin 3 to fall to nearly ground (i.e. nearly zero) voltage. In response, capacitor 284 will begin to discharge toward that lower voltage until it passes below $\frac{1}{3} V_{cc}$ whereupon the cycle just explained will repeat itself.

It should now be understood that this astable multivibrator action will continue at a frequency determined by the RC time constant of the timing circuitry. In addition, any control input current through pin 5 will vary the relevant threshold voltages making them somewhat more or less than $\frac{1}{3} V_{cc}$ apart (depending upon the direction of the input control current). Such a change in threshold voltages will result in a deviation in the period (and thus frequency) of the astable multivibrator which is approximately proportional to the modulating current (at least for relatively small deviations). Thus, transitions in the control input to pin 5 occurring at random time intervals will produce randomly timed deviations in the output frequency of the FM oscillator 104. The degree of such deviation will be determined by the amplitude of the input currents via potentiometer 106 and may, for example, provide ±2.5% frequency deviation. Because the period of the astable multivibrator is a function both of an RC time constant and $V_{cc}$ and because the noise voltage amplitude is also proportional to $V_{cc}$, a selected percent deviation via potentiometer 106 is relatively insensitive to supply voltage variations as well as to the mean frequency adjustment.

The charging and discharging voltage across capacitor 284 is thus fed back to form a hysteresis or relaxation type a stable multivibrator. Such a waveform is depicted as 284a in FIG. 4. As will be appreciated, such feedback will normally be at either frequency $f_1 + \Delta f$ or $f_1 - \Delta f$, where $f_1$ is the mean frequency. However, there will be an approximately 0.5 millisecond transition interval during which a relatively smooth upward/downward change in frequency occurs (e.g. over 10–20 cycles or so of the mean frequency in the exemplary embodiment). It will be appreciated that the waveforms shown in FIG. 4 are not necessarily to scale. An actual waveform across capacitor 284 is shown in the photograph of FIG. 6. It will be understood that FIG. 6 is actually a superposition of many repeated scans across the oscilloscope face. As might be expected, the photograph shows essentially two distinct frequencies of such a feedback signal. (i.e. the transition between frequencies is not readily visible in such a photograph).

The output from the FM oscillator 104 is, in the exemplary embodiment, essentially a square wave which occurs at the same frequency as the triggering feedback wave form 284a. An actual photograph of such an output wave form is shown in FIG. 7, where, once again, due to the repeated traces there depicted across the oscilloscope screen, one can observe essentially only the two limit frequencies of operation.

To permit the selection of an optimum peak-to-peak amplitude for the output drive voltage, potentiometer 110 permits a controlled portion of the oscillator output to be selected and conventionally amplified at 112 before being passed on to actually drive the piezoelectric crystal 50. As will be appreciated, capacitor 290 and resistors 292 and 293 are conventional interstage coupling components. A photograph of a resulting essentially square wave shaped output to the transducer at a randomly varying frequency is shown in FIG. 8. Once again, the relatively brief transition regions of constantly changing frequency between upper and lower frequency limits are not readily visible on the photograph. However, one does observe on the photograph both the upper and lower frequency components due to the repeated scanning of the oscilloscope face during the photograph's exposure. The same waveform is depicted schematically at 110a in FIG. 4.

In practice, the controllable parameters of the stimulator are adjusted by observation of an actual operating fluid jet array (curtain). The output signal amplitude and mean frequency are manually varied until all fluid jets in the curtain are observed to fall within a narrow "window" (i.e. minimum deviation from a straight line) of filament length to the droplet formation point. For a fluid pressure of approximately 10 psig, a viscosity of approximately 1 and orifice size of 0.0015 inch diameter, the mean or average period of the oscillator is typically within a range of approximately 15–20 microseconds. Such adjustment will vary from one orifice plate to the next as well as with expected system wear, changes in fluids, etc. thus necessitating occasional corrective adjustments.

Traveling acoustic waves within the fluid reservoir or other structures along the array can be expected to constructively add or destructively add if a single stimulation frequency is employed so as to produce nodes and antinodes at spaced points along the orifice array. These, in turn, cause slight but nevertheless visible irregularities in fluid filament lengths across the cross-machine dimension of the "curtain". Such irregularities, in turn, cause variations in actual droplet deflection and catching performance which, yet in turn, may manifest themselves as visible lighter and/or darker banding in the printing substrate along the cross-machine dimension of the apparatus. Furthermore, there may be unavoidable "beat notes" caused by tachometer pulse rate (web speed) and stimulation frequency which can result in periodic shifts in the synchronized droplet placement onto the moving substrate. These effects can produce moire' patterns on the substrate under certain conditions.

To avoid these undesirable variations in the discernible appearance of the substrate after printing, random artificial perturbation is purposefully employed. In the exemplary embodiment, this involves a slight variation of the stimulation period between two values with transitions occurring at random time intervals (preferably within an 8-17 Hz bandwidth). Such random artificial perturbations induce random variations in the filament length and beat note frequencies which tend to blur what would otherwise be discernible banding and/or moire' patterns on the printed substrate so as to render them substantially imperceptible under most conditions. In effect, such otherwise discernible defects are randomly "dithered" about on the substrate so as to make them, in the ensemble, relatively undetectable.

At the same time, care must be taken to avoid excessive deviation in the stimulation, because that may cause the liquid filament length variations to exceed an acceptable "window" length (i.e. the effective control zone of the charging electrodes) thus causing a loss of printing control. Accordingly, the degree of deviation or percent RAP is preferably chosen at the minimum value required to overcome the adverse discernible effects otherwise present when only a single stimulation frequency is employed. Such an adjustment must be empirically determined for each particular fluid jet applicator arrangement, as should now be apparent. However, based on experience to date, a deviation of approximately ±2.5 percent with transitions occurring at random times within an 8-17 Hertz bandwidth seems to produce good results with a system having the following configuration:

One exemplary system uses 0.0013 inch orifice holes in an orifice plate centered along a line at 200 holes per inch. The system may typically operate at a pressure of about 10 psi gage with a center or mean frequency of RAP of about 46 kilohertz. The charge electrode inter-element spacing (and hence the system print resolution) in the direction perpendicular to web travel is 144 to the inch (i.e. the center-to-center spacing between elemental charge electrodes is 1/144 or 0.00694 inch). Each such charge electrode element is about 0.125 inch long (i.e. along the direction of droplet movement) and is spaced about 0.125 inch downwardly from the orifice plate. The print distance, that is the distance from the orifice plate to substrate, is about 0.75 inch, and the vertical spacing between the charge plate and catcher-deflection ribbon is about 0.065 inch. The catcher is about 0.350 inch overall dimension and the deflection ribbon 0.187 inch. The array of charge electrodes is faced on the opposite side of the jet array by a combination shielding/counter-electrode which is electrically grounded. A similar ground shield is typically employed opposite the lower portion of the catcher.

A zero percent RAP adjustment is provided in the exemplary embodiment so as to allow for some extended range control (i.e. beyond that which is absolutely necessary) and to give a "positive feel" to the control. It may also be somewhat easier to make the nominal mean frequency and output amplitude adjustments by observations made when random variations are not present.

It will be understood that the nominal period, adjustment range, noise bandwidth and percent RAP may vary for different systems. Higher power output levels may require different output circuitry and wider deviation requirements may necessitate some modifications in the FM oscillator. It is also possible that the use of RAP for relatively short cross-machine dimensions may sometimes tend to cause reduced edge definition and increased splatter.

A square wave output is used in the exemplary embodiment simply because it is somewhat less complicated to generate than a sinusoidal output waveform and because the relatively higher harmonic content of the square waveform has not been observed to produce any harmful effects. Of course the piezoelectric crystal itself may tend to "ring" and produce a more or less sinusoidal waveform as its actual acoustic output. In any event, sinusoidal or other waveform shapes could just as well be used at the output if desired.

The output amplifier 112 merely provides the proper drive level and isolation for the stimulation transducer (e.g. piezoelectric crystal 50).

Figure 9:
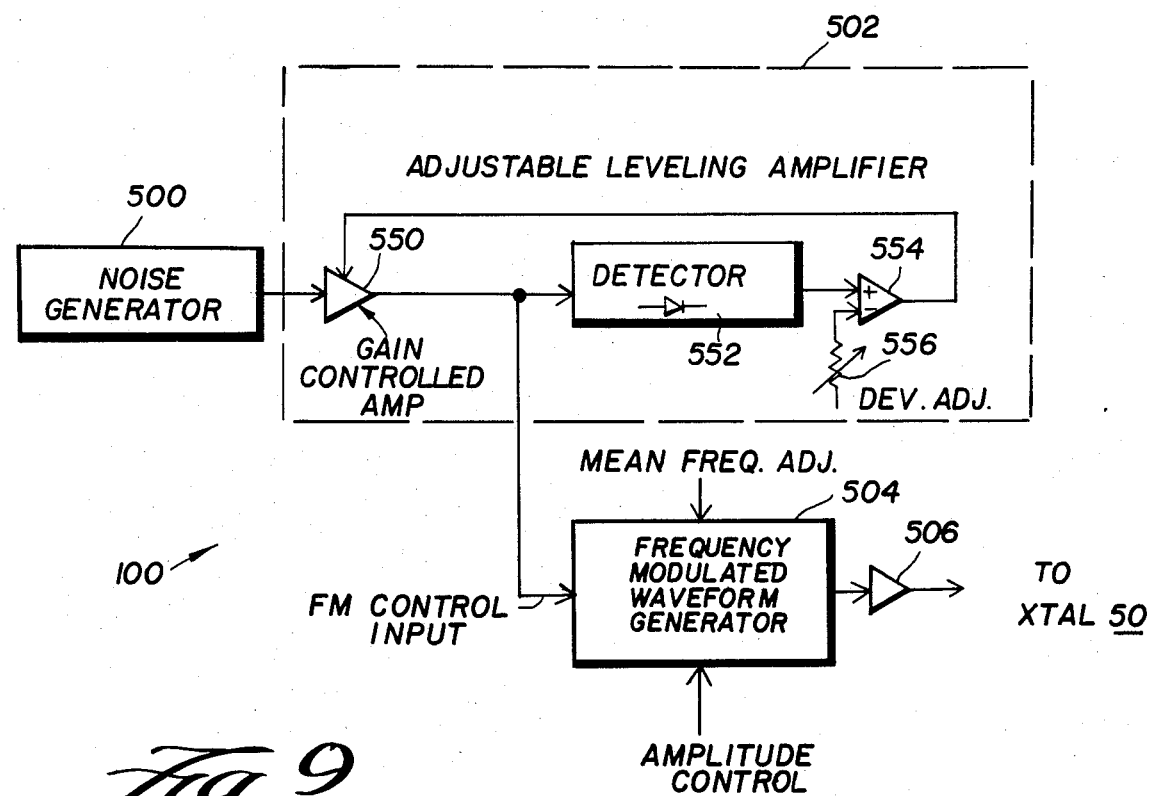
FIG. 9 is a schematic circuit diagram of yet another exemplary embodiment of the random artificial perturbation mechanism shown in FIG. 1.

Another exemplary embodiment of the random artificial signal source 100 is depicted at FIG. 9. Here, a relatively broad band noise generator 500 feeds an adjustable leveling amplifier 502 which, in turn, feeds a frequency modulated waveform generator 504 (a sine wave function generator) which, in turn, feeds an output buffer amplifier 506 which drives the piezoelectric transducer 50.

The noise generator 50 may, for example, comprise a simple transistor operated in an emitter-base breakdown region so as to produce a rich broad band noise spectrum. This broadband noise signal may then be input to a conventional operational transconductance gain controllable amplifier 550. A sample of the amplified noise may be conventionally detected by detector 552 and then compared at 554 with a deviation adjustment input 556 to derive a feedback gain control for amplifier 550. Any difference detected between the set level from deviation adjustment 556 and the detected average or peak level output from amplifier 550 will adjust the gain of the amplifier 550 accordingly so as to maintain a desired level of output. In this manner, the maximum or peak-to-peak frequency deviation of the waveform generator 504 can be controlled.

The frequency modulated waveform generator 504 may be a conventional integrated circuit (e.g. XR 2206) connected so as to produce a low distortion sine wave. Typically, outboard potentiometers may be used to set internal timing currents so as to define the mean frequency of the wave form generator while another similar outboard potentiometer may be used to control the output amplitude of the generator. The frequency is further controlled by an FM control input supplied to an appropriate input pin so as to modulate internal timing currents and thus modulate the output frequency of the generator 504. A dynamic self-limit to the degree of noise modulation is naturally reached when the rate of frequency deviation caused by high frequency noise components exceeds the center frequency. Beyond this point, any increase in attempted noise modulation should have no significant effect on the output signal, except to superimpose the noise signal on the output signal.

Output buffer amplifier 506 is simply a conventional buffer amplifier chosen and otherwise designed so as to provide the desired level of output drive and isolation to the crystal 50.

While only a few exemplary embodiments of this invention have been described in detail, those skilled in the art will appreciate that many possible modifications and variations may be made in the exemplary embodiments while yet retaining many of their novel advantages and features. Accordingly, all such modifications and variations are intended to be included in the scope of the appended claims.

What is claimed is:

1. An electrostatic fluid jet applicator comprising:
    means for selectively passing fluid droplets onto a substrate surface by (a) electrostatically charging selected droplets as they are formed from an array of fluid filaments and (b) thereafter electrostatically deflecting the charged droplets into a catcher and away from a trajectory which otherwise passes the uncharged droplets onto said substrate surface; and
    artificial perturbation means acoustically coupled to said fluid for assisting in the formation of said droplets;
    said artificial perturbation means including frequency deviation means for generating acoustic vibrations at a frequency which continually and automatically changes sufficiently to obscure the effect of standing waves on a printed substrate.

2. An electrostatic fluid jet applicator as in claim 1 wherein said artificial perturbation means includes an astable oscillator having a frequency control input and wherein said frequency deviation means includes a random signal generator which provides a randomly varying control signal to said frequency control input.

3. An electrostatic fluid jet applicator for selectively applying fluid droplets to the surface of a relatively moving substrate, said applicator comprising:
    a fluid supply;
    an array of fluid jet orifices communicating with said supply for passing fluid filaments therethrough which subsequently break into fluid droplets while passing toward said substrate;
    droplet charging and deflection means disposed for selectively electrostatically charging and deflecting selected ones of said droplets away from passage toward said substrate; and
    random aritificial perturbation means acoustically coupled to said fluid for artificially stimulating the formation of said droplets at a rate which is controllably varied sufficiently to obscure the effect of standing waves on a printed substrate.

4. An electrostatic fluid jet applicator as in claim 3 wherein said random artificial perturbation means varies the droplet stimulation rate between upper and lower limits at randomly varying time intervals.

5. An electrostatic fluid jet applicator as in claim 4 wherein said random artificial perturbation means includes means limiting said randomly varying time intervals to a predetermined frequency bandwidth.

6. An electrostatic fluid jet applicator as in claim 5 wherein said frequency bandwidth extends approximately from 8 to 17 Hz, wherein the mean droplet stimulation rate is in excess of 14 KHz and wherein the droplet stimulation rate varies by no more than about ±10% from said mean rate.

7. An electrostatic fluid jet applicator as in claim 4, 5, or 6 wherein said random artificial perturbation means includes transition control means for causing a gradual transition of the droplet stimulation rate between said upper and lower limits.

8. An electrostatic fluid jet applicator as in claim 3, 4, 5, or 6, wherein said random artificial perturbation means includes:
    mean frequency adjustment means for controlling the mean rate of droplet stimulation; and
    deviation adjustment means for controlling the maximum deviation of the rate of droplet stimulation from said mean rate.

9. An electrostatic fluid jet applicator as in claim 8 wherein said random artificial perturbation means includes:
    amplitude adjustment means for controlling the amplitude of acoustic droplet stimulation forces.

10. In an artificially perturbed electrostatic fluid jet applicator using an acoustically coupled fluid droplet stimulation processor, the improvement comprising:
    a random electrical signal generator means for producing a first randomly varying electrical signal;
    electrical signal control means including an astable oscillator coupled to receive said randomly varying electrical signal and to produce a second randomly varying electrical signal having a controlled mean frequency and a controlled frequency deviation therefrom; and
    an electro-mechanical transducer connected to receive said second randomly varying electrical signal and disposed to produce corresponding acoustic vibrations which are, in turn, coupled to control said fluid droplet stimulation process.

11. An improved aritificially perturbed electrostatic fluid jet applicator as in claim 10 wherein said electrical signal control means includes means for controlling the amplitude of said first randomly varying electrical signal.

12. In an artifically perturbed electrostatic fluid jet applicator using an acoustically coupled fluid droplet stimulation process, the improvement comprising:
    a random electrical signal generator means for producing a first randomly varying electrical signal;
    electrical signal control means coupled to receive said randomly varying electrical signal and to produce a second randomly varying electrical signal having a controlled mean frequency and a controlled frequency deviation therefrom; and
    an electro-mechanical transducer connected to receive said second randomly varying electrical signal and disposed to produce corresponding acoustic vibrations which are, in turn, coupled to control said fluid droplet stimulation process,
    wherein said random electrical signal generator means comprises a cascaded chain of plural amplifiers having a predetermined bandpass and connected so as to amplify the inherent noise of the first amplifier stage to produce, as said first randomly varying signal, a clamped amplitude random frequency square wave.

13. An improved artificially perturbed electrostatic fluid jet applicator as in claim 12 wherein said electrical signal control means comprises:

a signal divider coupled to receive said first signal and to provide an FM control signal therefrom having an amplitude representing the magnitude of desired frequency deviation;

an FM modulator circuit connected to receive said FM control signal as input and to produce as output said second signal having a frequency determined by the amplitude of the FM control signal;

said FM modulator circuit also having a mean frequency control means for determining the mean frequency of said second signal.

14. An improved artificially perturbed electrostatic fluid jet applicator as in claim 13 wherein said electrical signal control means further includes:

an RC circuit coupling said FM control signal to said FM modulator circuit so as to insure a relatively gradual frequency transition in said second signal.

15. An electrostatic fluid jet application method comprising:

selectively passing fluid droplets onto a substrate surface by (a) electrostatically charging selected droplets as they are formed from an array of fluid filaments and (b) thereafter electrostatically deflecting the charged droplets into a catcher and away from a trajectory which otherwise passes the uncharged droplets onto said substrate surface; and acoustically coupling artificial perturbations to said fluid for assisting in the formation of said droplets;

said artificial perturbations being generated at a frequency which is modulated by an independently generated control signal.

16. An electrostatic fluid jet application method as in claim 15 wherein said artificial perturbations are generated by an astable oscillator having a frequency control input and wherein a randomly varying control signal is generated and applied to said frequency control input.

17. An electrostatic fluid jet application method for selectively applying fluid droplets to the surface of a relatively moving substrate, said method comprising:

passing pressurized fluid through an orifice array to produce fluid filaments which subsequently break into fluid droplets while passing toward a relatively moving substrate;

electrostatically charging and deflecting selected ones of said droplets away from passage toward said substrate; and artificially stimulating the formation of said droplets at a rate which varies sufficiently to obscure the effect of standing waves in the printed substrate.

18. An electrostatic fluid jet application method as in claim 17 wherein said artificial stimulations occur at a rate which varies between upper and lower limits at randomly varying time intervals.

19. An electrostatic fluid jet application method as in claim 18 wherein said randomly varying time intervals are limited to occur within a predetermined frequency bandwidth.

20. An electrostatic fluid jet application method as in claim 19 wherein said frequency bandwidth extends approximately from 8 to 17 Hz, wherein the mean droplet stimulation rate is in excess of 14 KHz and wherein the droplet stimulation rate varies by no more than about ±10% from said mean rate.

21. An electrostatic fluid jet application method as in claim 18, 19 or 20 wherein there occurs a gradual transition of the droplet stimulation rate between said upper and lower limits.

22. In an artificially perturbed electrostatic fluid jet application method using an acoustically coupled fluid droplet stimulation process, the improvement comprising:

producing a first randomly varying electrical signal;

producing a second randomly varying electrical signal as a function of said first signal and having a controlled mean frequency and a controlled continually changing frequency deviation therefrom; and using said second randomly varying electrical signal to drive an electro-mechanical transducer disposed to produce corresponding acoustic vibrations which are, in turn, coupled to control said fluid droplet stimulation process.

23. An improved artifically perturbed electrostatic fluid jet application method as in claim 22 including the step of controlling the amplitude of said first randomly varying electrical signal.

24. In an artificially perturbed electrostatic fluid jet application method using an acoustically coupled fluid droplet stimulation process, the improvement comprising:

producing a first randomly varying electrical signal;

producing a second randomly varying electrical signal as a function of said first signal and having a controlled mean frequency and a controlled frequency deviation therefrom; and using said second randomly varying electrical signal to drive an electro-mechanical transducer disposed to produce corresponding acoustic vibrations which are, in turn, coupled to control said fluid droplet stimulation process;

wherein said first signal is generated by a cascaded chain of plural amplifiers having a predetermined bandpass and connected so as to amplify the inherent noise of the first amplifier stage to produce, as said first randomly varying signal, a clamped amplitude random frequency square wave.

25. An improved artifically perturbed electrostatic fluid jet application method as in claim 24 wherein said using step comprises:

processing said first signal to provide an FM control signal therefrom having an amplitude representing the magnitude of desired frequency deviation;

controlling an FM modulator circuit connected to receive said FM control signal as input and to produce as output said second signal having a frequency determined by the amplitude of the FM control signal;

controlling the mean frequency of said second signal.

26. An improved artificially perturbed electrostatic fluid jet application method as in claim 25 further comprising the step of:

producing only relatively gradual frequency transitions in said second signal.

* * * * *